（12）United States Patent
Bohannon et al.

(10) Patent No.: US 9,152,735 B2
(45) Date of Patent: Oct. 6, 2015

(54) METHOD AND APPARATUS FOR COMPOSING XSL TRANSFORMATIONS WITH XML PUBLISHING VIEWS

(75) Inventors: Philip L. Bohannon, Bridgewater, NJ (US); Henry F. Korth, Lower Gwynedd, PA (US); Chengkai Li, Champaign, IL (US); Suranarayan Perinkulam, Bridewater, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 3714 days.

(21) Appl. No.: 10/626,835

(22) Filed: Jul. 24, 2003

(65) Prior Publication Data

US 2005/0021548 A1    Jan. 27, 2005

(51) Int. Cl.
*G06F 7/00* (2006.01)
*G06F 17/30* (2006.01)

(52) U.S. Cl.
CPC .............................. *G06F 17/30914* (2013.01)

(58) Field of Classification Search
CPC ............................................... G06F 17/30929
USPC ........ 707/1–3, 5, 6, 10, 101, 102, 104.1, 760, 707/759; 715/513
See application file for complete search history.

(56) References Cited

U.S. PATENT DOCUMENTS 6,643,652 B2 * 11/2003 Helgeson et al. ............... 707/10
6,654,734 B1 * 11/2003 Mani et al. ........................ 707/2
6,772,165 B2 * 8/2004 O'Carroll ...................... 707/101
6,785,673 B1 * 8/2004 Fernandez et al. ................ 707/3
6,826,568 B2 * 11/2004 Bernstein et al. ................. 707/6
6,928,449 B2 * 8/2005 Ten-Hove et al. .............. 707/102
6,968,346 B2 * 11/2005 Hekmatpour ............. 707/104.1
7,054,859 B2 * 5/2006 Kuno et al. ......................... 1/1
2002/0049788 A1 * 4/2002 Lipkin et al. ................... 707/513
2002/0123993 A1 * 9/2002 Chau et al. ........................ 707/5
2003/0167254 A1 * 9/2003 Su et al. ............................ 707/1
2004/0010754 A1 * 1/2004 Jones ............................. 715/513

OTHER PUBLICATIONS

C. Li et al., "Composing XSL Transformations with XML Publishing Views," ACM SIGMOD 2003.*
James Clark, "XSL Transformations (XSLT) Version 1.0," Nov. 16, 1999, W3C.*

* cited by examiner

*Primary Examiner* — Mariela Reyes
*Assistant Examiner* — Paul Kim
(74) *Attorney, Agent, or Firm* — Ryan, Mason & Lewis, LLP

(57) ABSTRACT

A method and apparatus are provided for composing XSL transformations with XML publishing views. XSL transformations are performed on XML documents defined as views of relational databases. A portion of a relational database can be exported to an XML document. An initial view query defines an XML view on the relational database and an XSLT stylesheet specifies at least one transformation. The initial view query is modified to account for an effect of the transformation and the modified view query is applied to the relational database to obtain the XML document. When the modified view query is evaluated on a relational database instance, the same XML document is obtained as would be obtained by evaluating the XSLT stylesheet on the original XML view.

24 Claims, 22 Drawing Sheets

FIG. 2

```
hotelchain(chainid, companyname, hqstate)
metroarea(metroid, metroname)
hotel(hotelid, hotelname, starrating, chain id
      metro id, state id, city, pool, gym)
guestroom(r id, rhotel id, roomnumber, type, rackrate)
confroom(c id, chotel id, croomnumber, capacity, rackrate)
availability(a id, a r id, startdate, enddate, price)
```

FIG. 3

```
<metro name="NYCMetroNJ">
    <hotel name="Hyton" pool="Y" gym="N">
        <confstat capacity="3200"/>
        <confroom name="Green Flamingo" capacity="240"/> ...
        ...
    </hotel>
    <hotel> ... </hotel> ...
</metro>
```

FIG. 4

```
<xsl:template match="pattern" mode="integer">
    <Result>
        <xsl:apply-templates select="expression"/>
    </Result>
</xsl:template>
```

FIG. 5

```
<xsl:template match="/">                                        (R1)
    <HTML>
        <HEAD></HEAD>
        <BODY>
            <xsl:apply-templates select="metro"/>
        </BODY>
    </HTML>
</xsl:template>
<xsl:template match="metro">                                    (R2)
    <result_metro>
      <A></A>
      <xsl:apply-templates
          select="hotel/confstat"/>
    </result_metro>
</xsl:template>
<xsl:template match="confstat">                                 (R3)
    <result_confstat>
      <B></B>
      <xsl:apply-templates
          select="../hotel_available/../confroom"/>
    </result_confstat>
</xsl:template>

<xsl:template match="metro/hotel/confroom">                     (R4)
    <xsl:value-of select="."/>
</xsl:template>
```

FIG. 6

```
Function PROCESS(x, d_con, mode)
Input: XSLT stylesheet as x, Context document node as d_con,
       Desired mode of the matched rule as mode
Output: XML document fragment as result
1: result ← empty
2: for r_i ∈ x in decreasing order of priority(r_i) do
3:     if mode(r_i) = mode and MATCH(d_con, r_i) then
4:         result ← output (r_i)
5:         for a_j ∈ apply(r_i) do
6:             D_new_con ← SELECT(d_con, a_j)
7:             sub_result ← empty
8:             for d_new_con ∈ D_new_con do
9:                 sub_result ← concatenate(sub_result,
                                 PROCESS(x, d_new_con, mode(a_j)))
10:            Replace a_j in result with sub_result
11:    return result
```

FIG. 7

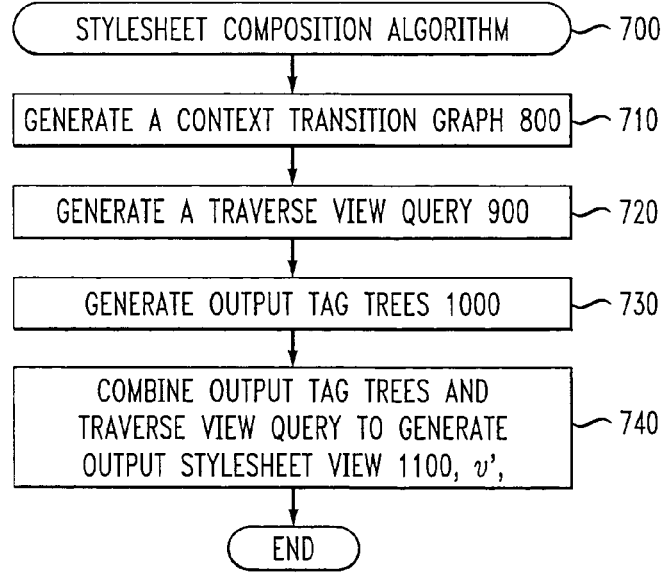

(a) TRAVERSE VIEW QUERY (b) OUTPUT TAG TREE (c) STYLESHEET VIEW

Procedure Compose(v,x)
Input: v: original schema-tree view query; x: XSLT stylesheet
Output: stylesheet view
1: $ctg$: a Context Transition Graph
2: $tvq$: a Traverse View Query
3: $ottree$: an Output Template Tree
4: for $n \in v$ do
5:    for $r \in x$ do
6:       if $MATCHQ(n, r) \neq NULL$ then
7:          add $(n, r)$ to $ctg$
8: for $(n_1, r_1) \in ctg$ do
9:    for $(n_2, r_2) \in ctg$ do
10:       for $a \in apply(r_1)$ do
11:          $t \leftarrow SELECTQ(n_1, a, n_2)$, $p \leftarrow MATCHQ(n_2, r_2)$
12:          if $t \neq NULL$ and $mode(a) = mode(r_2)$ then
13:             add an edge $e = ((n_1, r_1), (n_2, r_2), a)$ to $ctg$
14:             $smt(e) \leftarrow COMBINE(t, p)$
15: (repeatedly) Delete all nodes without incoming edge, except $(root, r)$
16: $tvq \leftarrow ctg \ \{(copy)\}$, $bvmap(root \ of \ tvq) \leftarrow empty$
17: (repeatedly) Duplicate nodes with multiple incoming edges, splitting incoming edges and copying outgoing edges
18: replace binding variables in $tvq$ with new, unique binding variables
19: for $e = (w_1 = (n_1, r_1), w_2 = (n_2, r_2), a)$ in edges of $ctg$ do
20:    $(Q_{bv(w_2)}, bvmap(w_2)) \leftarrow$
      $UNBIND(smt(e), n_1, n_2, bv(w_2), bvmap(w_1))$
21:    for all binding variables $bv$ referenced in $Q_{bv(w_2)}$ do
22:       rename $bv$ as $bvmap(w_2).get(bv)$

FIG. 13 cont.

23: for $w = (n,r) \in tvq$ do

24:    $ott(w) = GENERATE\_OTT(n,r)$

25: $ottree \leftarrow ott(w) \; \forall \; w \in tvq$ {initially a forest}

26: for $e = (w_1, w_2, a)$ in edges of $tvq$ do

27:    $a' \leftarrow$ the "apply-template" node in $ott(w_1)$ which is a copy of $a$ 28:    replace $a'$ with an edge from $parent(a')$ to $root(ott(w_2))$)

29: for $w = (n, r) \in tvq$ do

30:    $bv(root(ott(w))) \leftarrow bv(w)$

31:    $Q_{bv(root(ott(w)))} \leftarrow Q_{bv(w)}$

32: Remove the topmost "pseudo-root" node in $ottree$

33: while there is any "pseudo-root" node $pr$ left do

34:    for each child node $c$ of $pr$ do

35:        add edge $e = (parent(pr), c)$

36:        if $Q_{bv(c)}$ is empty then

37:            $bv(c) \leftarrow bv(pr)$, $Q_{bv(c)} \leftarrow Q_{bv(pr)}$

38:        else

39:            $Q_{bv(c)} \leftarrow UNBIND(parent(pr), c)$

40:            add the SELECT columns of $Q_{bv(pr)}$ to $Q_{bv(c)}$

41:            change "$bv(pr)$" as "$bv(c)$" in the tag queries of $c$'s descendents 42:    remove edge $e = (parent(pr), pr)$ and node $pr$ 43: return $ottree$ {new stylesheet view}

Function $UNBIND(m, n)$
Input: Query context node as $m$, Target node to unbind as $n$
Output: Unbound query for $n$ as $q$
1: $n_j \leftarrow$ the lowest common ancestor of $m$ and $n$
2: $s_j \leftarrow bv(n_j)$
3: $child_n(n_j) \leftarrow$ child node of $n_j$ along the path from $n_j$ to $n$
4: $s_{j-1} \leftarrow bv(child_n(n_j))$
5: $q \leftarrow Q_{bv(n)}^{s_1, s_2, ..., s_{j-1}}(s_j', ..., s_k')$, which is the unbound tag query of $n$, $Q_{bv(n)}(s_1, s_2, ..., s_k)$
6: return $q$

FIG. 15

Function $NEST(p, p')$
Input: Node as $p$, Child node as $p'$
Output: Tag query for $p$ after nesting as $q$
1: $q \leftarrow Q_{bv(p)}$
2: for each child node $c$ of $p$, except $p'$ do
3:     $q_c \leftarrow NEST(c, NULL)$
4:     add $EXISTS$ $q_c$ in $WHERE$ clause of $q$
5: return $q$

FIG. 16

1: {Replace line 5 of Figure 10}
2: $P \leftarrow$ {nodes along the path from $child_n(n_j)$ to $n$}
3: for node $p \in P$ do
4:     $p' \leftarrow$ child of $p \in P$, otherwise $NULL$
5:     $\Theta_{bv(p)} \leftarrow NEST(p, p')$
6: $q \leftarrow \Theta_{bv(n)}^{s_1, s_2, ..., s_{j-1}}(s_j', ..., s_k')$, which is the unbound and nested tag query of $n$, $\Theta_{bv(n)}(s_1, s_2, ..., s_k)$, and decorrelation of $bv(s_i)$ is done by $\Theta_{s_i}$.

FIG. 17

Function $UNBIND(smt, m, n, bv', bvmap)$

Input: Select-match subtree as $smt$, Query context node of $smt$ as $m$, New query context node of $smt$ as $n$, New binding variable as $bv'$, Binding variable map as $bvmap$.

Output: Unbound query for $smt$ as $q$, New binding variable map as $bvmap'$.

1: $q \leftarrow UNBIND(m, n)$
2: $n_j \leftarrow$ the lowest common ancestor of $m$ and $n$
3: $child_n(n_j) \leftarrow$ child node of $n_j$ along the path from $n_j$ to $n$
4: $R \leftarrow \{$nodes along the path from $child_n(n_j)$ to $n\}$
5: for node $p \in R$ do
6:   add the $SELECT$ columns of $Q_{bv(p)}$ to $q$
7: $P \leftarrow \{$nodes along the path from root of $smt$ to $m\}$
8: for node $p \in P$ do
9: for each child node $c$ of $p$, such that $c \notin P$ and $c \notin R$ do
10:   $q_c \leftarrow NEST(c, NULL)$
11:   add $EXISTS$ $q_c$ in $WHERE$ clause of $q$
12: $bvmap' \leftarrow bvmap$
13: for node $p \in R$ do
14:   $bvmap'.insert(bv(p), bv')$
15: $child_m(n_j) \leftarrow$ child node of $n_j$ along the path from $n_j$ to $m$
16: $S \leftarrow \{$nodes along the path from $child_m(n_j)$ to $m\}$
17: for node $s \in S$ do
18:   $bvmap'.remove(bv(s))$
19: return $(q, bvmap')$ (R1), (R3), and (R4) are the same as Figure 4.

<xsl:template match="metro">                               (R2)
    <xsl:apply-templates select="hotel/confstat"/>
</xsl:template>

```
(R1) and (R2) are the same as Figure 4.

<xsl:template match="confstat">                                (R3)
    <result_confstat>
        <B/>
        <xsl:apply-templates select=".[@sum<200]/
            ../hotel_available/../confroom
            [../confstat[@sum>100]] [@capacity>250]"/>
    </result_confstat>
</xsl:template>

<xsl:template match="metro[@metroname=
            "chicago"]/hotel/confroom">                         (R4)
    <xsl:value-of select="."/>
</xsl:template>
```

FIG. 23

{Insert the following
(a) after line 8 of Figure 13
(b) after line 1 of Figure 11}
$e_p \leftarrow$ predicate using $tag(p)$
add $e_p$ in $WHERE$ clause of $q$

FIG. 24

```
SELECT * FROM confroom
WHERE chotel_id=$s_new.hotelid
      AND capacity > 250
      AND $s_new.SUM_capacity<200
      AND $s_new.metroname="chicago"
      AND EXISTS (SELECT SUM (capacity)
                  FROM confroom,
                  WHERE chotel_id=$s_new.hotelid
                  HAVING SUM (capacity) > 100)
      AND EXISTS (SELECT COUNT (a_id), startdate
                  FROM availability, guestroom
                  WHERE rhotel_id=$s_new.hotelid
                       AND a_r_id=r_id
                  GROUP BY startdate)
```

FIG. 25

(a)
```
<xsl:template match="pattern" mode="m">
    <xsl:if test="expression">
        template body
    </xsl:if>
</xsl:template>
```

(b)
```
<xsl:template match="pattern" mode="m">
    <xsl:apply-templates select=" . [expression] " mode="mnew"/>
</xsl:template>

<xsl:template match="nodename" mode="mnew">
    template body
</xsl:template>
```

FIG. 26

(a)
```
<xsl:template match="pattern" mode="m">
    <xsl:choose>
        <xsl:when test="e1">b1</xsl:when>
        <xsl:when test="e2">b2</xsl:when>
        <xsl:otherwise>b3</xsl:otherwise>
    </xsl:choose>
</xsl:template>
```

(b)
```
<xsl:template match="pattern" mode="m">
    <xsl:apply-templates
        select=" . [e1] " mode="mnew1"/>
    <xsl:apply-templates
        select=" . [not (e1) and e2] "
        mode="mnew2"/>
    <xsl:apply-templates
        select=" . [not (e1) and not (e2)] "
        mode="mnew3"/>
</xsl:template>

<xsl:template match="nodename"
        mode="mnew1">b1</xsl:template>
<xsl:template match="nodename"
        mode="mnew2">b2</xsl:template>
<xsl:template match="nodename"
        mode="mnew3">b3</xsl:template>
```

FIG. 27

(a)
```
<xsl:template match="pattern" mode="m">
    <xsl:value-of select="expression"/>
</xsl:template>
```

(b)
```
<xsl:template match="pattern" mode="m">
    <xsl:apply-templates
        select="path expression" mode="mnew"/>
</xsl:template>

<xsl:template match="nodename[predicate]"
        mode="mnew">
    <xsl:value-of select=" . "/>
</xsl:template>
```

FIG. 28

(a)
```
<xsl:template match="pattern 1" mode="m">
    template body 1
</xsl:template>

<xsl:template match="pattern 2" mode="m">
    template body 2
</xsl:template>
```

(b)
```
<xsl:template match="pattern 1" mode="m1">
    template body 1
</xsl:template>

<xsl:template match="pattern 2" mode="m">
    <xsl:choose>
        <xsl:when test="expression 1">
            <xsl:apply-templates select=" . "
                    mode="m1"/>
        </xsl:when>
        <xsl:otherwise>
            template body 2
        </xsl:otherwise>
    </xsl:choose>
</xsl:template>
```

FIG. 29

```
<xsl:template match="/metro">                                        (R1)
    <xsl:param name="idx" select="10"/>
    <result_metro>
        <xsl:apply-templates
        select="hotel/hotel_available[@count>10]
                /metro_available[@count<$idx] ">
            <xsl:with-param name="idx"
                select="$idx"/>
        </xsl:apply-templates>
    </result_metro>
</xsl:template>

<xsl:template match="metro_available">                               (R2)
    <xsl:param name="idx"/>
    <xsl:choose>
        <xsl:when test="idx<=1">
            <xsl:value-of select=" . "/>
        </xsl:when>
        <xsl:otherwise>
            <result_metroavail>
                <xsl:apply-templates
                        select="self::[@count>50]/../../..">
                    <xsl:with-param name="idx"
                                select="$idx-1"/>
                </xsl:apply-templates>
            <result_metroavail>
        </xsl:otherwise>
    </xsl:choose>
</xsl:template>
```

FIG. 31

```
<xsl:template match="/metro">                                           (R1')
    <xsl:param name="idx" select="10"/>
    <result_metro>
        <xsl:apply-templates
            select="metroavail_down[@count<$idx]">
            <xsl:with-param name="idx"
                select="$idx"/>
        </xsl:apply-templates>
    </result_metro>
</xsl:template>

<xsl:template match="metroavail_down">                                  (R2')
    <xsl:param name="idx"/>
    <xsl:choose>
        <xsl:when test="$idx<=1">
            <xsl:value-of select="."/>
        </xsl:when>
        <xsl:otherwise>
            <result_metroavail>
                <xsl:apply-templates
                    select="../metroavail_up">
                    <xsl:with-param
                        name="idx" select="$idx-1"/>
                </xsl:apply-templates>
            <result_metroavail>
        </xsl:otherwise>
    </xsl:choose>
</xsl:template>

<xsl:template match="metroavail_up">                                    (R3')
    <xsl:param name="idx"/>
    <result_metro>
        <xsl:apply-templates
            select="../metroavail_down[@count<$idx]">
            <xsl:with-param
                name="idx" select="$idx"/>
        </xsl:apply-templates>
    <result_metro>
</xsl:template>
```

METHOD AND APPARATUS FOR COMPOSING XSL TRANSFORMATIONS WITH XML PUBLISHING VIEWS

FIELD OF THE INVENTION

The present invention relates generally to techniques for mapping between a relational database and an XML document, and more particularly, to a method and apparatus for composing XML transformations with XML publishing views.

BACKGROUND OF THE INVENTION

As the Extensible Markup Language (XML) has continued to gain popularity as a standard for information representation and exchange, tools to render and present XML documents are increasingly supported by common application platforms. Many of these tools implement the XML Stylesheet Langauge (XSL), a World Wide Web Consortium (W3C) standard (see, for example, W3C, XSL Transformations (XSLT) Version 2.0, http://www.w3.org/TR/xslt20/). The XSL Stylesheet Langauge is divided into transformation and formatting subsystems. The transformation subsystem reorganizes the tree structure of an XML document and the formatting subsystem renders the result into a display format. The transformation sublanguage, referred to as XML Stylesheet Language Transformations, or XSLT, has proven very popular with developers and is often implemented as a standalone tool. Some of the well-known implementations of XSLT are XT™, SAXON™ and XALAN™. XSLT is used, for example, to translate XML documents to HTML documents, and to modify or select part of an XML document. While XSLT was not expressly designed as a query language, XSLT can be used for "query-like" transformations.

Despite widespread use of XML standards for business data exchange, the vast majority of business data is stored and maintained by relational database systems. Thus, XML-publishing middleware technology is rapidly being implemented by relational database vendors to ensure that XML-centric applications are well supported. Such middleware provides a declarative view query language with which to specify the desired mapping between the relational tables and the resulting XML document. Based on the mapping defined by the view query, a portion of the database can be exported as XML.

Given the respective importance of XML views and XSLT, it is important to propose efficient execution of XSLT stylesheets against XML-publishing views. For example, for large documents or complicated stylesheets, fully materializing the XML view as an XML document, upon which an XSLT stylesheet is evaluated is problematic, simply due to performance problems that commonly arise with XSLT evaluation on large documents. Recent work has explored optimizing the execution of XSLT transformations by incorporating XSLT processing into database query engines. However, even if XSLT evaluation can be made scalable and efficient, it may not be a good solution for XML documents published from relational database systems. For example, it is not necessary to materialize many of the nodes in the view query to produce the correct XSLT result document. First, node types not referenced by any XPATH expressions in the XSLT stylesheet need not be materialized. Similarly, nodes that do not match selection conditions in the appropriate XSLT templates are not useful. Finally, intermediate nodes along the XPATH expression need not be materialized if they are not part of the result. A need therefore exists for a view composition approach to supporting XSLT in relational XML middleware.

SUMMARY OF THE INVENTION

Generally, a method and apparatus are provided for composing XSL transformations with XML publishing views. The XML Stylesheet Language for Transformations (XSLT) can be used for query-like operations on XML documents including selecting and restructuring data. The present invention performs XSL transformations on XML documents defined as views of relational databases.

According to one aspect of the invention, a portion of a relational database can be exported to an XML document. An initial view query defines an XML view on the relational database and an XSLT stylesheet specifies at least one transformation. The initial view query is modified in accordance with the invention to account for an effect of the transformation and the modified view query is applied to the relational database to obtain the XML document.

In one implementation, a first graph is generated representing processing done by the XSLT stylesheet. The first graph is combined with a second graph representing the initial view query by matching pairs of nodes from the first and second graphs. The combined graph can be a context transition graph for an XSLT stylesheet executed on the initial view query. The context transition graph captures context transitions that occur when evaluating the XSLT stylesheet on the XML document produced by the initial view query.

The combined graph is pruned to remove unnecessary nodes and modified to produce a modified view query that handles formatting instructions. A traverse view query can be generated from the context transition graph prior to generating the modified view query that captures traversal actions of the XSLT stylesheet on the XML document produced by the initial view query. The formatting instructions can be expressed as output tag trees for each node in the traverse view query. The output tag trees are combined with the traverse view query to generate the modified view query.

When the modified view query is evaluated on a relational database instance in accordance with the present invention, the same XML document is obtained as would be obtained by evaluating the XSLT stylesheet on the original XML view. In this manner, inefficient XSLT processing is replaced by queries pushed into relational database engines. In addition, the modified view query does not generate the unnecessary nodes.

A more complete understanding of the present invention, as well as further features and advantages of the present invention, will be obtained by reference to the following detailed description and drawings.

BRIEF DESCRIPTION OF THE DRAWINGS

FIG. 2 illustrates an exemplary hotel reservation schema that defines a relation;

FIG. 3 illustrates a portion of an XML document produced from an XML view;

FIG. 4 illustrates an exemplary XSLT template rule;

FIG. 5 illustrates an exemplary XSLT stylesheet;

FIG. 6 contains exemplary pseudo code for a conventional transformation algorithm;

FIG. 7 is a flow chart describing an exemplary implementation of a stylesheet composition algorithm incorporating features of the present invention;

FIG. 13 provides pseudo code for an exemplary stylesheet composition algorithm according to the present invention;

FIG. 14 illustrates exemplary pseudo code for an UNBIND function incorporating features of the present invention;

FIG. 15 illustrates exemplary pseudo code for a NEST function that generates a nested sub-query for a subtree under a node in a select-match subtree;

FIG. 16 illustrates modifications to the exemplary pseudo code for the UNBIND function of FIG. 14 for an alternate implementation;

FIG. 17 illustrates exemplary pseudo code for an UNBIND function for a select-match subtree;

FIG. 23 illustrates modifications to the exemplary pseudo code for the UNBIND function of FIG. 14 for an alternate implementation for predicates;

FIG. 24 illustrates an unbound query for the output tag trees of FIG. 18;

FIG. 25 illustrates transformations for an if function in XSL;

FIG. 26 illustrates transformations for a choose function in XSL;

FIG. 27 illustrates transformations for a value-of function in XSL;

FIG. 28 illustrates transformations for conflict resolution;

FIG. 29 provides an example of a stylesheet with recursive rules;

FIG. 31 illustrates a stylesheet x' for composing the example of FIG. 29 with the schema tree query of FIG. 1.

DETAILED DESCRIPTION

Figure 1:
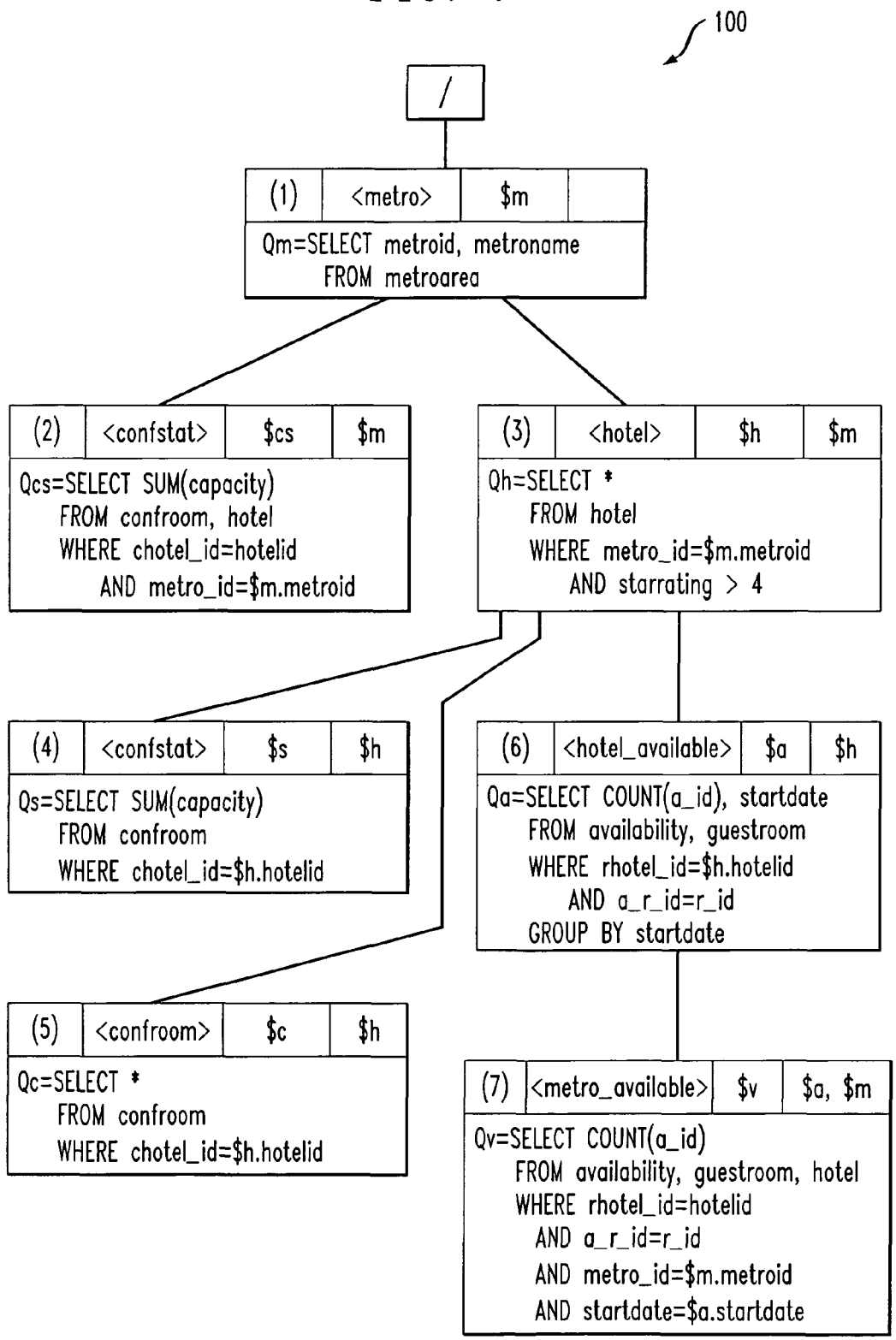
FIG. 1 illustrates an exemplary schema tree query that defines an XML view on the tables of FIG. 2.

The present invention takes the view composition approach and supports execution of XSLT against XML-publishing views by first composing the transformations in a stylesheet with a publishing view, resulting in a composed stylesheet view. Evaluating the stylesheet view on a database instance results in the same XML document that would be produced by evaluating the XSLT stylesheet on the original XML view. The stylesheet view does not generate the unnecessary nodes described above, thus providing improved efficiency. In addition, the present invention removes the cost of parsing and XSLT processing. Rather, the XSLT processing is pushed into SQL queries processed by relational query engines. Such view composition algorithms have previously been designed for user XQUERY or XPATH queries to be efficiently executed by XML publishing middleware and relational engines. The present invention develops similar techniques with XSLT.

The present invention defines a restrictive subset of XSLT, referred to herein as XSLTbasic, and provides an algorithm that can compose an XSLTbasic stylesheet with an XML view definition to produce a new XML view definition, the stylesheet view. Generally, the algorithm consists of three steps. First, a graph representing the processing done by the XML stylesheet is constructed. Second, this graph is combined with a graph representation of the XML view query by matching pairs of nodes from the two graphs in a manner similar to the creation of a cross-product automaton. Finally, the resulting graph is pruned to remove unnecessary nodes and modified to handle formatting instructions, producing the stylesheet view. For a discussion of alternative approaches, see C. Li et al., "Composing XSL Transformations with XML Publishing Views," ACM SIGMOD 2003 (2003), incorporated by reference herein.

XML Publishing Views and XSLT Stylesheets

Schema Tree Queries

An exemplary embodiment of the present invention employs the view-query specification format as defined in ROLEX (see, P. Bohannon et al., "Optimizing View Queries in ROLEX to Support Navigable Result Trees," Proc. 28th Int. Conf. Very Large Data Bases, VLDB, 119-30 (2002); or P. Bohannon et al., "The Table and the Tree: On-Line Access to Relational Data Through Virtual XML Documents, "Proc. of WebDB (2001), each incorporated by reference herein). This query format, referred to as a schema tree query, is meant to capture a rich set of XML view queries, and is adapted from the intermediate query representation of SilkRoute. While ROLEX focuses on a particular system architecture with tight integration between the application and the DBMS, the present invention does not rely on any particular features of ROLEX, and thus is expected to be readily adaptable to other XML view languages. For a more detailed discussion of schema tree queries, see, for example, P. Bohannon et al., "Optimizing View Queries in ROLEX to Support Navigable Result Trees," Proc. 28th Int. Conf. Very Large Data Bases, VLDB, 119-30 (2002).

As used herein, a schema tree query, v, is a set of nodes $\{n_i\}$, each of which is a 6-tuple $(id(n_i), tag(n_i), bv(n_i), parameters(n_i), Q_{bv}(n_i), children(n_i))$, where $id(n_i)$ is a unique identifier, $tag(n_i)$ is the tag, $bv(n_i)$ is the binding variable of $n_i$, $parameters(n_i)$ is the set of parameters of $Q_{bv}(n_i)$, which is the tag query of $n_i$, and $children(n_i)$ is the set of child nodes of $n_i$.

FIG. 1 illustrates an exemplary schema tree query 100 that defines an XML view on the tables of FIG. 2, in order to support conference planning by showing candidate hotels along with information about availability of rooms in the same metro area. FIG. 2 illustrates an exemplary hotel reservation schema 200.

The identifier (id) of a node is used to identify a node uniquely in v. For example, in FIG. 1, there are two nodes that have the same tag <confstat>, but different ids, 2 and 4. Each tuple returned by the tag query $Q_{bv}(n_i)$ becomes an element in the resulting XML document with XML tag $tag(n_i)$; this element is said to have been generated by $n_i$. For example, the node with id 1 in FIG. 1 has associated with it the tag <metro> and the tag query "$Q_m$=SELECT metroid, metroname FROM metroarea." This query defines a list of metropolitan areas that become sibling nodes in the resulting XML document, each tagged with the <metro> tag (a unique document root is implied). Relational attributes from the SELECT clause appear as XML attributes of the generated element. FIG. 3 illustrates a portion of an XML document 300 produced from the XML view.

Tag queries may be parameterized by zero or more parameters, associated with binding variables. The query that defines binding variable $bv(n_i)$ is referred to as $Q_{bv}(n_i)$, with parameters($n_i$) as the binding variables used in the body of the query. The binding variable $bv(n_i)$, a tuple variable ranging over the results of $Q_{bv}(n_i)$, is used as a parameter when specifying the tag queries of descendant nodes of $n_i$. For example, the variable m associated with <metro> is used as a parameter in tag queries for <hotel> and <metro_available> to refer to the attribute m.metroid.

The remainder of the view in FIG. 1 defines the following. The tag query, $Q_h(m)$ for <hotel> is parameterized by the tuple variable m ranging over metropolitan areas and gives a list of hotels in that metropolitan area. The tag query, $Q_a(h)$, for <hotel_available> counts available rooms at the given hotel in a certain fixed time period, whereas the tag query, $Q_v(m, a)$ for <metro_available> counts the total available rooms in the entire metropolitan area for that same time period. In separate branches of the schema tree 200, summary and detail information about conference rooms is given by the nodes with tags <confstat> and <confroom>, respectively.

XSLT

As used herein, an XSLT stylesheet x is a set of template rules $\{r_i\}$, each of which is a 4-tuple (match($r_i$), mode($r_i$), priority($r_i$), output($r_i$)), where match($r_i$) is the match pattern of $r_i$, mode($r_i$) is the mode of $r_i$, priority($r_i$) is the priority of $r_i$, and output($r_i$) is the output-tree fragment of $r_i$.

The skeleton of a template rule 400 is shown in FIG. 4, and an example stylesheet is shown in FIG. 5, which contains four template rules R1 through R4. The match pattern of a template rule, match($r_i$), is a pattern and is essentially a subset of XPATH path expressions containing only child, descendant ("//"), and attribute axes. For example, as shown in FIG. 5, match(R2) is "metro." The mode of a rule, mode($r_i$), is a symbol that allows rules to be partitioned; that is, rule invocations must match in mode as well as match pattern. If there is no mode attribute, the XSLT processor will set it to be a default value. Similarly the priority of a rule, priority($r_i$), is an integer, used in conflict resolution and is briefly discussed hereinafter. The output tree fragment for a rule, output($r_i$) controls the structure of a rule's output. For (R2) of FIG. 5, the output tree fragment consists of the <result metro> tag and its contents. The output tree fragment output($r_i$) may contain a set of <xsl:apply-templates> nodes, apply($r_i$)={$a_j$}, as defined below.

As used herein, an apply-templates node, $a_j$, is a 2-tuple of the form (select ($a_j$), mode($a_j$)), where select ($a_j$) is the select expression of $a_j$, and mode($a_j$) is the mode of $a_j$. The select expression select ($a_j$) is a subset of XPATH expressions intended to ensure that results of the expression are nodes rather than atomic values. In (R2) of FIG. 5, there is only one apply-templates node and its select expression is "hotel/confstat." The mode mode($a_j$) limits the rules which may match as described above.

XSLT Processing Model

Basic XSLT processing consists of context transitions from a given XML document context node to a new context node recursively, starting from the root as the original context node, concatenating results in traversal order. FIG. 6 contains exemplary pseudo code for a conventional transformation algorithm 600. This is shown as a function PROCESS in FIG. 6. Context transition is realized by two functions, MATCH and SELECT.

For an XML document context node $d_{con}$ and a rule $r_i$, the function MATCH($d_{con}$; $r_i$) returns true if match($r_i$) matches some suffix of the incoming path from the document root to $d_{con}$. The semantics of a select expression is a function SELECT. For an XML document node $d_{con}$ matched by a rule $r_i$ and an apply-templates node $a_j \in r_i$, SELECT($d_{con}$; $a_j$) returns a set of nodes selected by select ($a_j$), with $d_{con}$ as the document context node.

In step 3 of FIG. 6, the algorithm 600 checks that mode($r_i$) is the desired mode and that MATCH($d_{con}$, $r_i$) returns true. If multiple rules match (step 2), the XSLT processor employs a conflict detection and resolution scheme that applies only the rule with the highest priority. Once a rule is activated, then, in steps 4-10 $d_{con}$ is used to instantiate output($r_i$) to construct the resulting document fragment select ($a_j$) evaluated on $d_{con}$ results in a node set $D_{new\_con}$. The apply-templates nodes $a_j \in $ apply($r_i$) are replaced with the concatenation of resulting document fragments produced by recursively processing each node $d_{new\_con} \in D_{new\_con}$ with mode($r_i$) as the desired mode. Therefore, the result of executing stylesheet x on XML document d is PROCESS(x; root; 0), where root is the root node of d.

In XSLT, there are special template rules called built-in template rules that cause the input document to be copied to the output. In all examples (including FIG. 4), all template rules that will be processed are listed, and it can be assumed that built-in rules have been overridden.

$XSLT_{basic}$

An $XSLT_{basic}$ algorithm processes a subset of XSLT, and has the following restrictions on XSLT: (1) no type-coercion, (2) no document order, (3) no recursion, (4) no predicates, (5) no flow-control elements, (6) no conflict resolution for template rules, i.e., no conflicting rules, (7) no functions and aggregations, and (8) no variables and parameters, (9) no use of the descendent (//) axis, and (10) select attribute of <value-of> or <copy-of> element can only be "." or an attribute "@attribute."

For a more detailed discussion of the first nine restrictions, see, W3C. XSL Transformations (XSLT) version 2.0, http://www.w3.org/TR/xslt20/. Restriction (10) is related to the simple model of output formatting used herein in which values produced from the database always appear as attributes of a node. As discussed below, the algorithms are extended to process supersets of $XSLT_{basic}$ that include restrictions (4), (5) and (6). The resulting subset of XSLT will cover a reasonable variety of XSLT stylesheets applied to XML-publishing views.

Algorithm Overview

Given a schema tree query v and an $XSLT_{basic}$ stylesheet x, a disclosed stylesheet composition algorithm 700, discussed further below in conjunction with FIG. 7, generates a new schema tree query v' (called a stylesheet view), ensuring that for any relational database instance I, the result of query v' on I is the same as the result of running x on the result of query v on I, i.e. v'(I)=x(I)). The complete algorithm is discussed below in conjunction with FIG. 13.

As shown in FIG. 7, for a schema tree query v and an XSLT stylesheet x, the stylesheet composition algorithm 700 begins during step 710 by generating a context transition graph (CTG) 800, discussed below in conjunction with FIG. 8. The context transition graph 800 (a) combines the selecting and matching steps in XSLT processing, and (b) captures the context transitions that occur when evaluating x on a document produced by v. Thereafter, the stylesheet composition algorithm 700 generates a traverse view query (TVQ) 900, discussed below in conjunction with FIG. 9, during step 720 which by definition is a schema-tree query. The TVQ 900 captures the traversal actions of x on v. Finally, the stylesheet composition algorithm 700 generates output tag trees 1000, discussed below in conjunction with FIG. 10, during step 730 that are combined with the TVQ during step 740 to generate an output stylesheet view 1100, v', discussed below in conjunction with FIG. 11. A detailed description of the steps to generate the CTG 800, TVQ 900, and stylesheet view 1100 are given below in the section entitled "Detailed Algorithm."

Context Transition Graph (CTG) 800

The context transition graph 800 for an $XSLT_{basic}$ stylesheet x executed on a schema tree query v, CTG(v,x), is a multigraph with a set of nodes M and a set of edges E. Each node meM, is annotated by a pair (n,r), where n is a node in the schema tree query v and r is an $XSLT_{basic}$ template rule in x. The CTG 800 for FIG. 5 is shown in FIG. 8, where (id(n), tag(n)) represents the node n. (Although id(n) can identify a node n uniquely, the redundant tag(n) eases presentation). Intuitively, the existence of a node (n, r) in CTG 800 means that one or more of the XML document nodes generated by node n may be matched by rule r. An edge, say e=((n',r'); (n, r), $a_j$), incoming to this node indicates the firing of rule r' on a document node d generated by n', might lead to one or more document nodes generated by n appearing in select ($a_j$) for some $a_j \in$ apply(r') (Since this may be true for multiple apply-template nodes, CTG(v,x) is a multigraph). Associated with each edge is a tree-pattern query, smt(e), referred to as the select-match subtree for e. Intuitively, smt(e) combines the select-expression of $a_j$ with the match-pattern of r, and is produced by the function COMBINE, described below in a section entitled "Functions Used in Composition."

Figure 8:
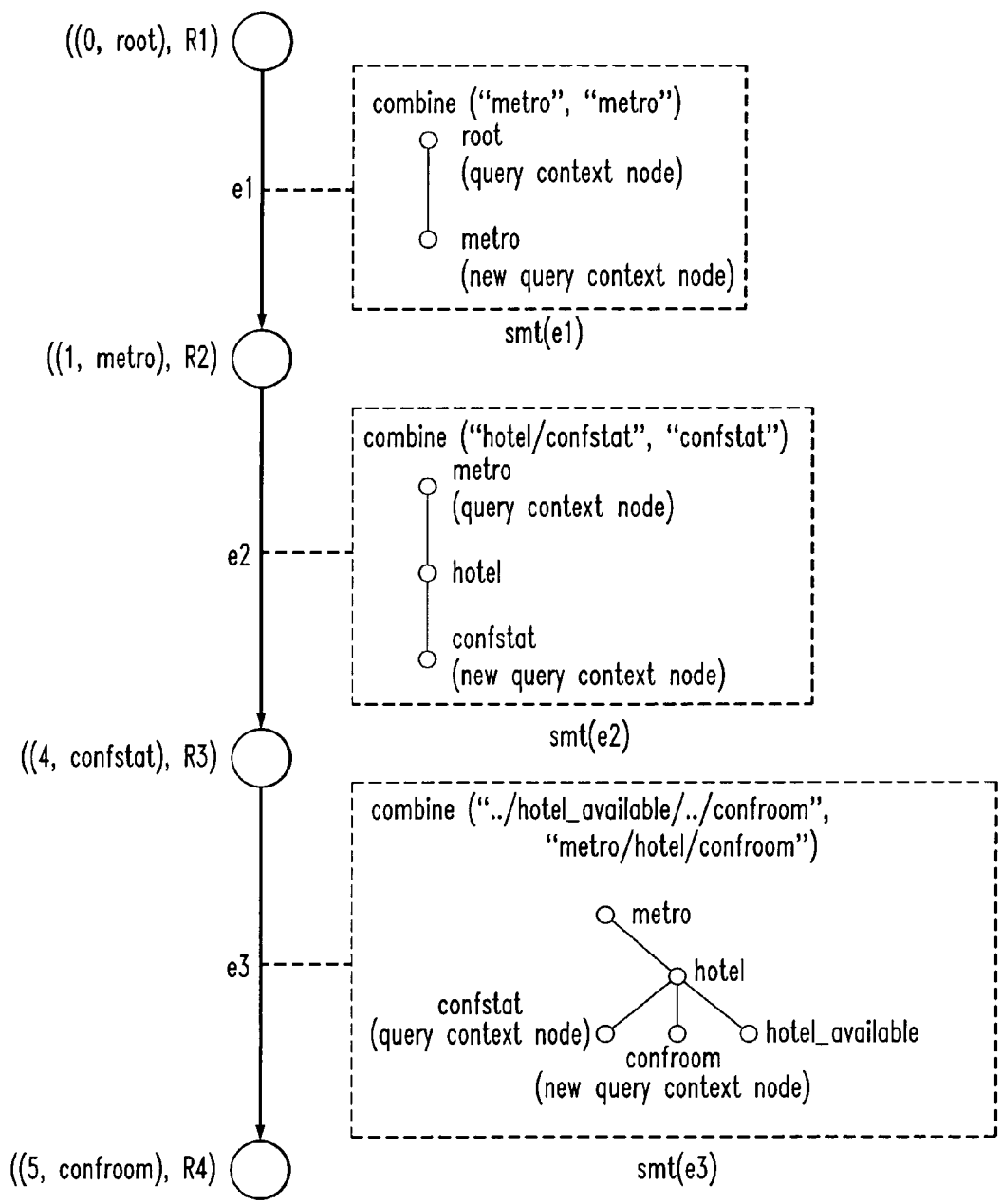
FIG. 8 is a context transition graph incorporating features of the present invention for the XSLT stylesheet of FIG. 5.

The left-hand side of FIG. 8 shows the CTG 800 produced while composing the stylesheet shown in FIG. 5 with the schema tree query of FIG. 1 (the right-hand side of FIG. 8 is discussed below in the section entitled "Functions Used in Composition"). Consider edge e2; this edge is present because applying the select expression "hotel/confstat" which appears in rule R2 to a document node produced by the metro node (id=1) in FIG. 1 can potentially lead to nodes produced by the confstat node (id=4) being matched against rule R3. Note that, while FIG. 8 is a simple path, CTGs 800 for $XSLT_{basic}$ stylesheets are actually directed acyclic multigraphs, and can be general multigraphs if recursion is allowed.

Traverse View Query (TVQ) 900

Figure 9:
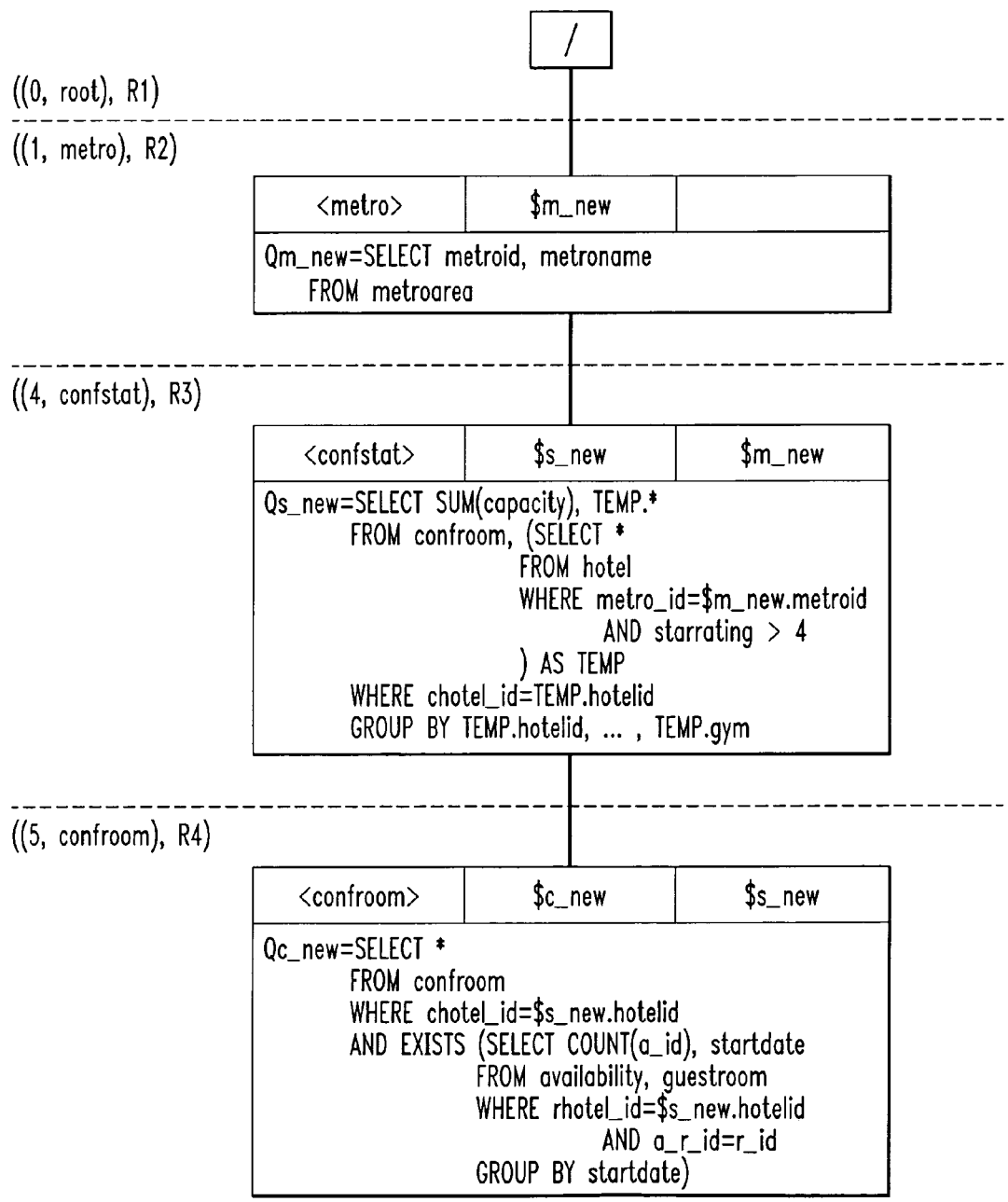
FIG. 9 is a traverse view query incorporating features of the present invention for the XSLT stylesheet of FIG. 5.

The traverse view query 900 is a schema tree query produced from the CTG 800. Intuitively, the nodes in the TVQ 900 will generate those document nodes that may become context nodes during stylesheet evaluation. In this sense, it supports the traversal of the original XML document by the $XSLT_{basic}$ stylesheet. One or more nodes appear in the traverse view query 900 for each node in the context transition graph 800 from which it is generated, with nodes being duplicated so that each node has a single incoming edge. The tree-pattern query of smt(e), where e=(($n_1$, $r_1$); ($n_2$, $r_2$); a), in the context transition graph 800, is translated into a tag query in the query node associated with ($n_2$, $r_2$). The TVQ 900 of FIG. 5 is shown in FIG. 9.

Output Tag Tree (OTT) 1000

Figure 10:
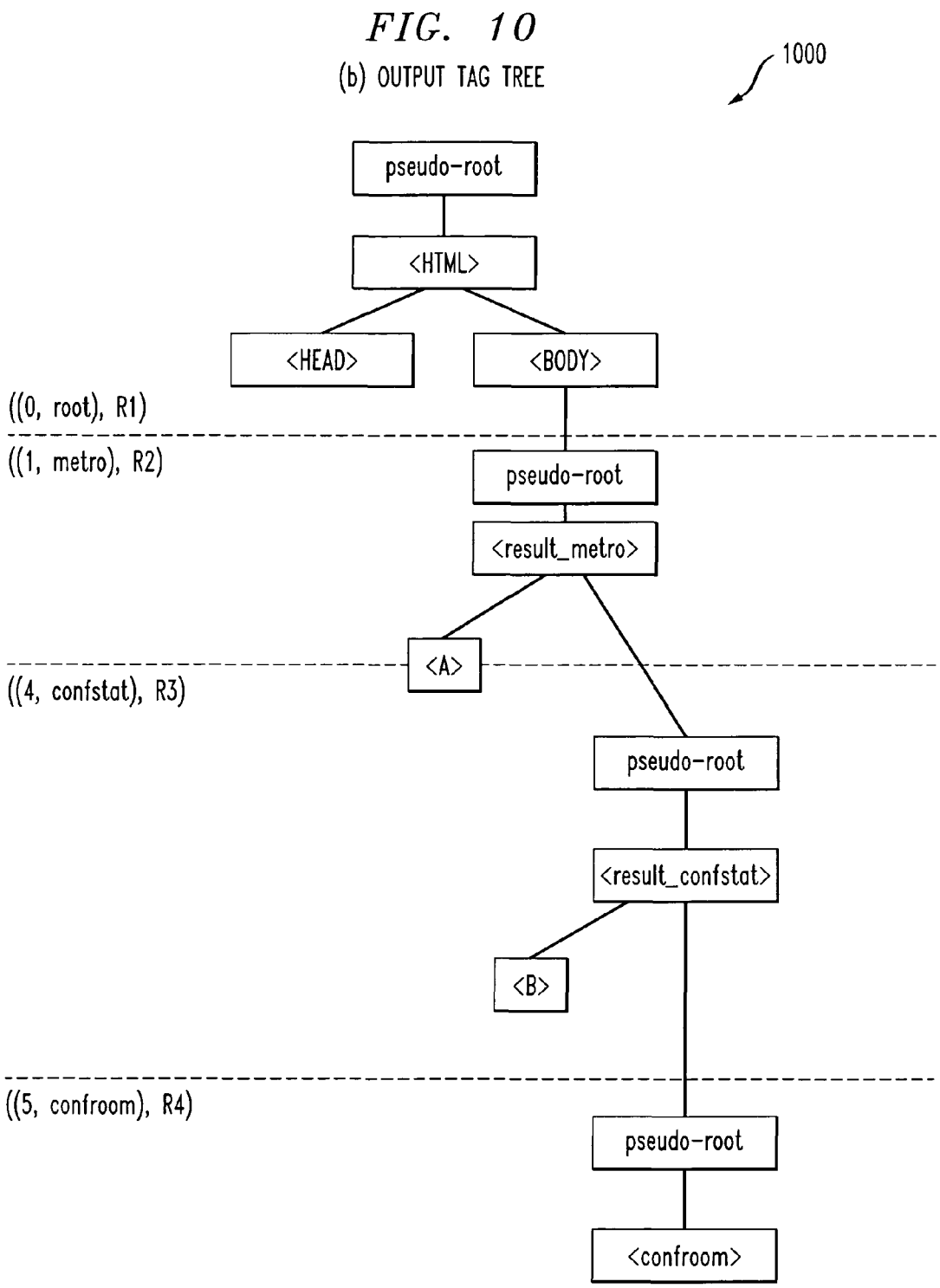
FIG. 10 is an output tag tree incorporating features of the present invention for the XSLT stylesheet of FIG. 5.

The generated TVQ 900 traverses the document nodes, but does not generate the expected output. To produce output, for each node (n, r) in the traverse view query 900, an output tag tree t 1000 is generated corresponding to r. The output tag trees 1000 for FIG. 5 are shown in FIG. 10. All the output tag trees 1000 are connected to form a single output tag tree 1000. The details about how the trees are generated and connected are discussed below in the section entitled "Generating Output Tag Tree."

Stylesheet View 1100

Figure 11:
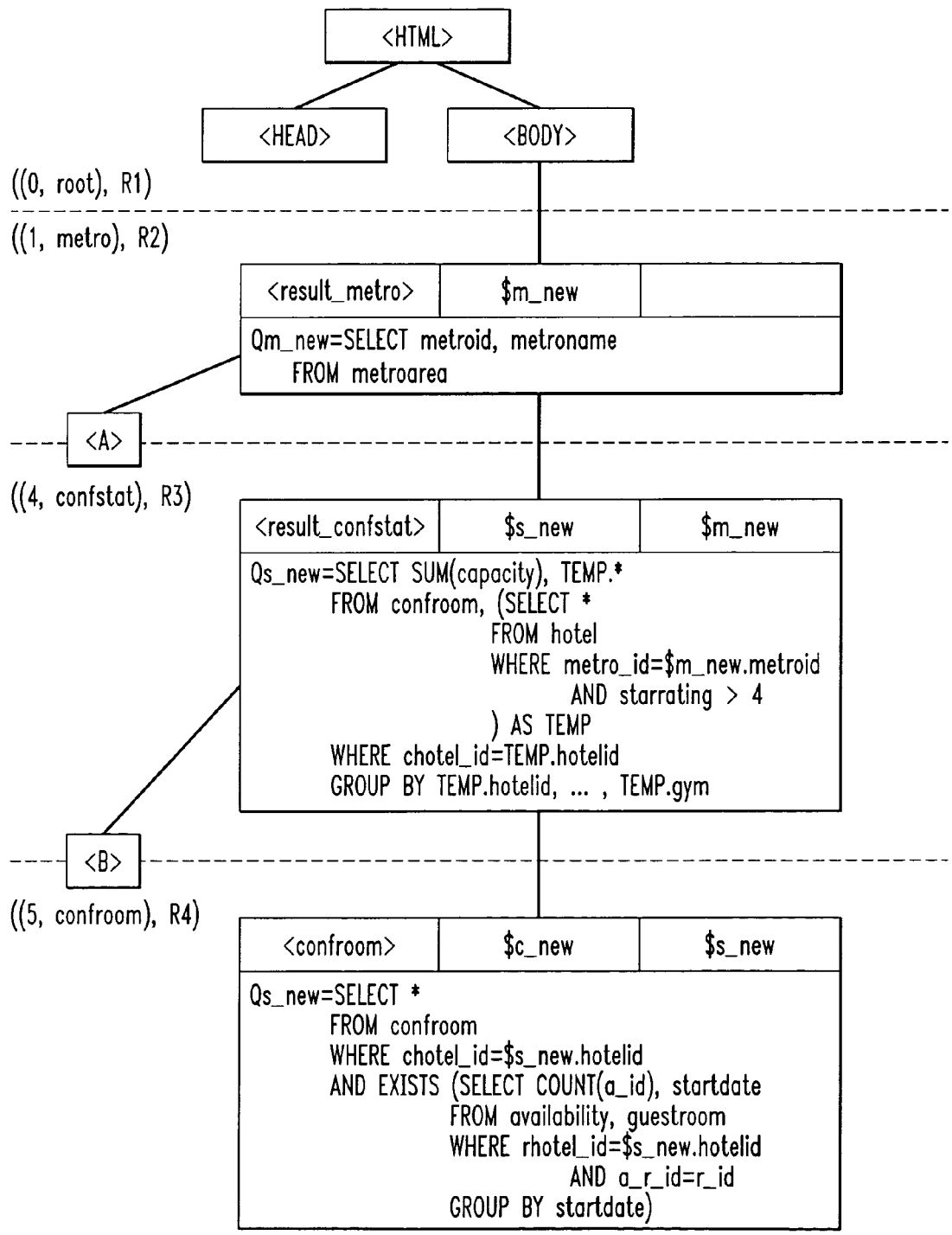
FIG. 11 illustrates the stylesheet view v' generated for the XSLT stylesheet of FIG. 5 by combining the traverse view query of FIG. 9 and the output tag trees 1000 of FIG. 10.

Combining the traverse view query 900 and output tag trees 1000, the stylesheet view v' 1100 is generated for the XSLT stylesheet, as is shown in FIG. 11. The combination entails copying the tag query for each node (n, r) in the traverse view query into the root of the output tag tree for (n, r). This is discussed below in the section entitled "Generating Stylesheet View."

Functions Used in Composition

SELECTQ and MATCHQ are analogous to SELECT and MATCH discussed above, but they operate on schema-tree nodes rather than data nodes. Recall that both SELECT and MATCH involve applying patterns to context nodes, either to derive a set of new context nodes or to determine whether the context nodes are matched. Correspondingly, when a pattern is applied abstractly on a schema tree query, there is a query context node, and a new query context node. For example, the pattern "hotel/confstat" might be applied abstractly to the query context node (1; metro) in FIG. 1 and determine that node (4, confstat) is a new query context node. A third function, COMBINE, produces the select-match subtrees associated with each edge in the CTG 800.

Given query node n and rule r, MATCHQ(n, r) checks if the template path match(r) matches some suffix of the path from the root to n in the schema tree query. In XSLT, the match(r) contains only child or descendant ("//") axis location steps. Since $XSLT_{basic}$ does not have the descendant axis, any match will correspond to a unique, simple path in the schema tree query. If such a path exists, it is returned as a tree-pattern query, otherwise NULL is returned. As a result, if $d_{con}$ is an instance of n, MATCH($d_{con}$,r) returns true if MATCHQ(n, r) returns a non-NULL value. For example, in FIG. 8, there is a node ((5; confroom);R4), and match(R4)="metro/hotel/confroom." FIG. 12 illustrates the corresponding tree-pattern query 1200, which has three nodes.

Given query nodes $n_1$ and $n_2$, rule r, and <apply-templates> element a∈apply(r), SELECTQ($n_1$, a, $n_2$) returns a tree-pattern query 1200 in which $n_1$ is the query context node and $n_2$ is the new query context node, or NULL. The tree-pattern query (if one is returned) is derived from select (a) by using $n_1$ as the context node and associating $n_2$ with the final selection-step in select (a). With selection step axes limited to <child> and <parent>, the resulting tree pattern will be unique. For example, if a is the apply-templates element in R3, then select (a)="../hotel_available/../confroom" and the corresponding tree-pattern query 1210 shown in FIG. 12.

Figure 12:
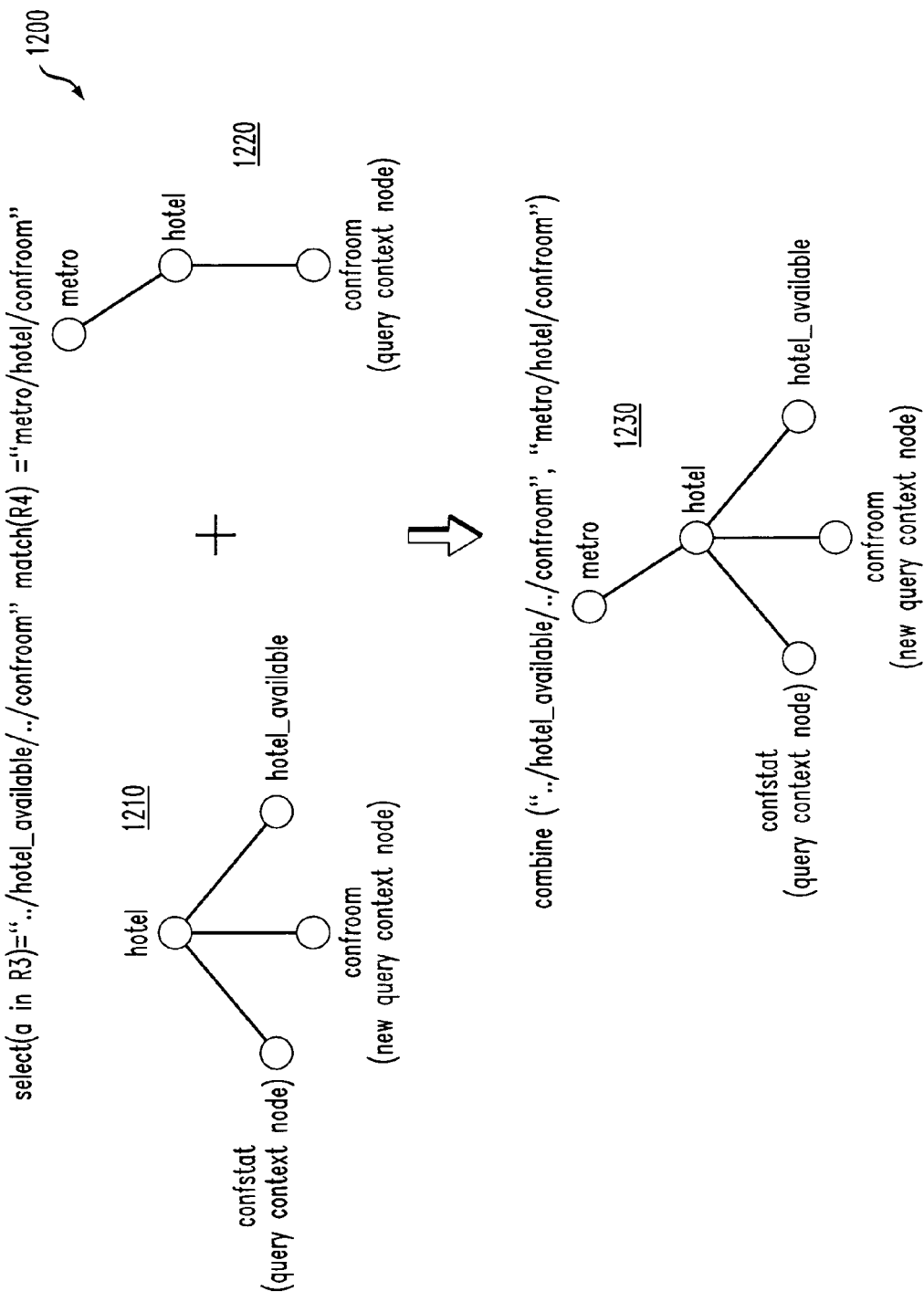
FIG. 12 illustrates a combined tree-pattern query formed from tree-pattern queries for select and match expressions.

Given the tree-pattern query t returned from SELECTQ and the tree-pattern query p returned from MATCHQ, COMBINE creates a combined tree-pattern query 1200 as shown in FIG. 12. To accomplish this, the two patterns 1210, 1220 are combined into a new pattern 1230 which is turned into a tree by a simple unification process, as follows. First, the node marked 'new query context node' in t and the node marked 'query context node' in p are unified (Unification succeeds if the two nodes have the same ids). If parents of the nodes just-unified exist in both queries, they are unified, and this process is repeated as many times as possible. Note that since both t and p are obtained from the schema tree query, the result of this process will be a tree. The function will fail if the initial unification fails, but as COMBINE is used herein, they are guaranteed to be the same schema tree node.

Detailed Algorithm

FIG. 13 provides the pseudo code for an exemplary stylesheet-composition algorithm 1300. The exemplary stylesheet-composition algorithm 1200 is described below in four steps corresponding to the four data structures discussed above in conjunction with FIGS. 8-11.

Step 1: Generating the CTG

Given a view query v and a stylesheet x, lines 3 to 14 in FIG. 13 create the context transition graph, ctg=CTG(v, x). An edge e=(($n_1$, $r_1$), ($n_2$, $r_2$), a) will appear in ctg if and only if the following conditions are satisfied:

(1) MATCHQ($n_1$, $r_1$)≠NULL,
(2) MATCHQ($n_2$, $r_2$)≠NULL,
(3) SELECTQ($n_1$, a, $n_2$)≠NULL, and
(4) mode(a)=mode($r_2$).

Edge e is labeled with the select-match subtree generated by the COMBINE function, which combines the tree-patterns for select (a) and match($r_2$). The new query context node in the tree pattern for select (a) is the same as the query context node in the tree-pattern for match($r_2$).

Step 2: Generating the TVQ

The generation of the traverse view query in FIG. 9 takes place in lines 16-22 of FIG. 13 and proceeds by copying the CTG (line 16), turning the resulting structure into a tree (line 17), and substituting new binding variables (lines 18). Next the tree-pattern query for each edge is translated to a parameterized SQL query, as described below. The translated SQL query becomes the tag query associated with the target node of the edge.

Generating the SelectMatch Subtree Query

FIG. 14 illustrates exemplary pseudo code for an UNBIND function 1400 incorporating features of the present invention. Generally, the UNBIND function 1400 translates a select-match subtree smt to an SQL query. Suppose the query context node and new query context node of smt are m and n respectively, and, n has a tag query $Q_{b,v}(n)(s_1, s_2, \ldots, s_k)$, parameterized by k binding variables, $s_1, s, \ldots, s_k$. The binding variables appearing in $Q_{b,v}(n)(s_1, s_2, \ldots, s_k)$ are recursively replaced with tag queries of ancestor nodes of n until $n_j$ is reached, the lowest common ancestor of m and n. The new query is $Q^{s_1, s_2, \ldots, s_{j-1}}(s_j, \ldots, s'_k)$, where $s_j$ is the binding variable for $n_j$ and $_{sj-1}$ is the binding variable for child$_n(n_j)$, the child node of $n_j$ along the path from $n_j$ to n. Further query transformations can be applied to this query. Since the procedure is essentially to remove the binding variables in tag queries, it is named the UNBIND function.

As an example, the select-match subtree smt(e2) in FIG. 8 is translated into an SQL query as follows. It is generated by unbinding the tag query $Q_s(h)$ of node <confstat> (with id 4), which is the new query context node in smt. All occurrences of binding variable $h in $Q_s(h)$ are replaced with references to a sub-query, the tag query Qh(m). Since <metro> is the lowest common ancestor of query context node <metro> and new query context node <confstat>, the unbinding stops. The resulting unbound query is:

```
SELECT SUM(capacity), TEMP.*
FROM confroom, (SELECT * FROM hotel
        WHERE metro_id=$m.metroid
        AND starrating > 4) AS TEMP
WHERE chotel_id=TEMP.hotelid
GROUP BY TEMP.hotelid,...,TEMP.pool,TEMP.gym
```

This query becomes the tag query of ((4, confstat), R3) as shown in FIG. 9, after the following transformation: the binding variable $m in the above query is renamed as $m_new, which is the binding variable of ((1, metro), R2). Note that a GROUP BY clause on all columns of TEMP are added into the query by unbinding to preserve the semantics of the aggregation SUM(capacity) in $Q_s(h)$.

Another example of this process is the query for smt(e3) in FIG. 8. The result of unbinding as described so far is shown here:

```
SELECT*FROM confroom
WHERE chotel_id=$h.hotelid
```

However, this query is incorrect due to three subtle issues. First, the select-expression for smt(e3) is "../hotel available/../confroom", so there must exist at least one <hotel available> node, but the unbound query above does not check for one. Second, such a <hotel available> node is not arbitrary, but must be a sibling node of the <confstat> node with the same parent. In case of a missing <hotel available> sibling, the XSLT stylesheet would not process the <confroom>. Third, in a more complex pattern <hotel available> may itself be the root of a subtree, requiring that the process be carried out recursively. To handle these three issues (existence, sibling and recursion conditions), the procedure of generating the query for select-match subtree smt is modified as shown in FIG. 17. A new function NEST (FIG. 15) is invoked from the procedure. Note that care must be taken in NEST to rename tables during processing to avoid namespace collision, but these details are not shown herein. Line 5 of FIG. 14 is also modified, as shown in FIG. 16, to satisfy the three conditions.

Suppose for smt, its query context node is m and its new query context node is n with the tag query $Q_n(s_1, \ldots, s_k)$. First the unbound query $Q_n^{s_1, \ldots, s_{j-1}}(s_j, \ldots, s'_{kO})$ is generated (line 1 in FIG. 17), using the function shown in FIG. 16. The unbound query involves every node along the path from child$_n(n_j)$ to n, denoted as nodeset(childn($n_j$)→n). The existence of every node along the path from $n_j$ to m, denoted as nodeset ($n_j$→m), is ensured because of the existence of m itself. Therefore, for every node in the set (nodeset (smt)\ (nodeset ($n_j$→m)≠∪nodeset (child$_n(n_j)$→n))), there should exist at least one matching document instance node. For a node P∈nodeset (child$_n(n_j)$→n), the existence of child nodes of p is checked by the EXISTS clause inserted at line 4 of NEST. Nesting is performed recursively for the nodes in the subtree under p. Similarly, for the child nodes (and the subtrees rooted at them) of nodes in nodeset ($n_j$→m), EXISTS clauses are inserted at lines 10-11 of FIG. 17. For example, the resulting query for tag query $Q_c$(h) should be as shown below:

```
SELECT * FROM confroom
    WHERE chotel_id=$h.hotelid
    AND EXISTS (
        SELECT COUNT (a_id), startdate
        FROM availability, guestroom
        WHERE rhotel_id=$h.hotelid
        AND a_r_id=r_id
        GROUP BY startdate)
```

This query becomes the tag query of ((5, confroom),R4) as shown in FIG. 8, after renaming the binding variables. A binding variable map, bvmap((n, r)), is associated with each node in the TVQ. In FIG. 17, the entries in bvmap((m,r')) are copied to bvmap((n, r)), except those entries for schema tree query nodes along the path child$_m$(n$_j$)→m. Moreover, entries are inserted for schema tree query nodes along the path child$_n$ (n$_j$)→n, such that the binding variables of these nodes in the original schema tree query are mapped to bv((n,r)). In the tag query for each node (n; r) in the TVQ, the referenced binding variables are renamed according to bvmap((n,r)).

Multiple Incoming Edges

There may be multiple incoming edges to a node labeled (n,r) in the CTG. Since query generation is defined for the select-match subtree associated with a single incoming edge, we need to duplicate (n,r) when we generate the TVQ (line 17). Since the children of this node now need to be duplicated (and their children, to the leaf nodes of the CTG), the size of the TVQ may be up to exponentially larger than the CTG.

Step 3: Generating Output Tag Tree

Figure 18:
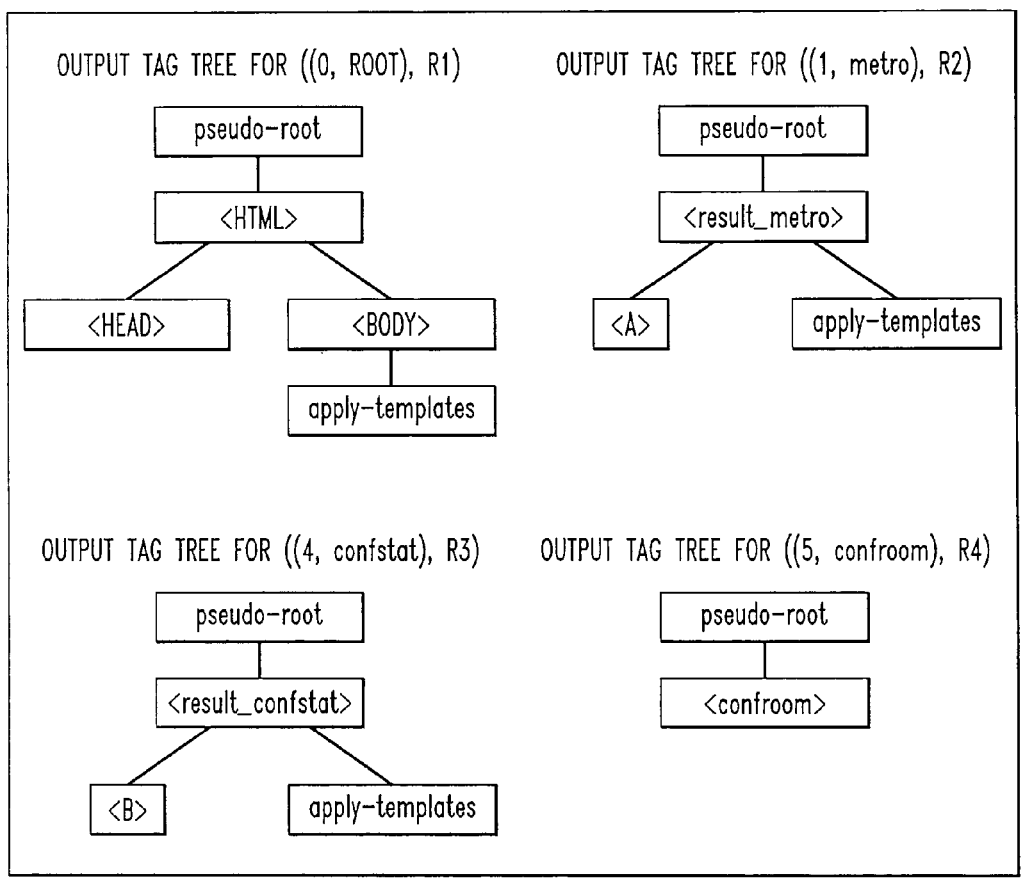
FIG. 18 illustrates output tag trees for nodes in the traverse view query of FIG. 9.

For each node (n,r) in TVQ, an output tag tree ott((n,r)) is generated by GENERATE_OTT(n,r) (lines 23-24), and then these trees are connected to form a single output tag tree OTT(v,x) (lines 26-28). The output tag trees for nodes in the TVQ of FIG. 8 are illustrated in FIG. 18, and the final output tag tree is shown in FIG. 9. Brief descriptions of the two steps are given below.

Generate OTT(n,r) Function

FIG. 14 is an example that illustrates the GENERATE_OTT(n,r) function 1400. For a node (n,r), ott((n,r)) is the tree representation of the hypertext fragment inside the template rule r. A root pseudo-root is added to the fragment. The element <xsl:valueof select=".">in r, is represented as a node with the tag n, for example the <confroom> node in ott((5, confroom),R4)). Each <xsl:apply-templates> element in r is represented as an apply-templates node in ott((n,r)). Not shown are <xsl:valueof select="@attribute"> elements which would cause data from the database to be attached to a node like <result-confstat>.

Connecting the Output Tag Trees

The output tag trees of the nodes in the TVQ are connected to form OTT(v,x). For two nodes (n$_1$,r$_1$) and (n$_2$,r$_2$), if (n$_1$,r$_1$) is the parent of (n$_2$,r$_2$), we add an edge from the parent of the apply-templates node in ott((n$_1$,r$_1$)) to the pseudo-root node in ott((n$_2$,r$_2$)), and remove the apply-templates node in ott ((n$_1$,r$_1$)).

Step 4: Generating Stylesheet View

The stylesheet view for FIG. 5 is shown in FIG. 11. The stylesheet view 1100 is generated by first copying queries from the TVQ to the OTT (lines 29-31), as shown in FIG. 13, and then removing pseudo-root nodes, pushing down queries (lines 32-42), as shown in FIG. 13.

The pushing down of queries is now described in more detail. If the child of the pseudo-root is an element specified in the OTT, the query will be empty and unbinding is not required. If the child already has a query (due to an <apply-templates> tag appearing at the top level of a rule body) then the child's tag query needs to be unbound with the tag query of the pseudo-root, a process referred to as forced unbinding. Note that (1) this significantly limits output formatting, but adds better formatting without affecting the rest of the algorithm and (2) pushing the query down separately into the apply-templates nodes will cause the results for these apply-templates to be grouped rather than interleaved; leaning more towards the assumption that document order is not supported by view composition.

Figures 19, 20:
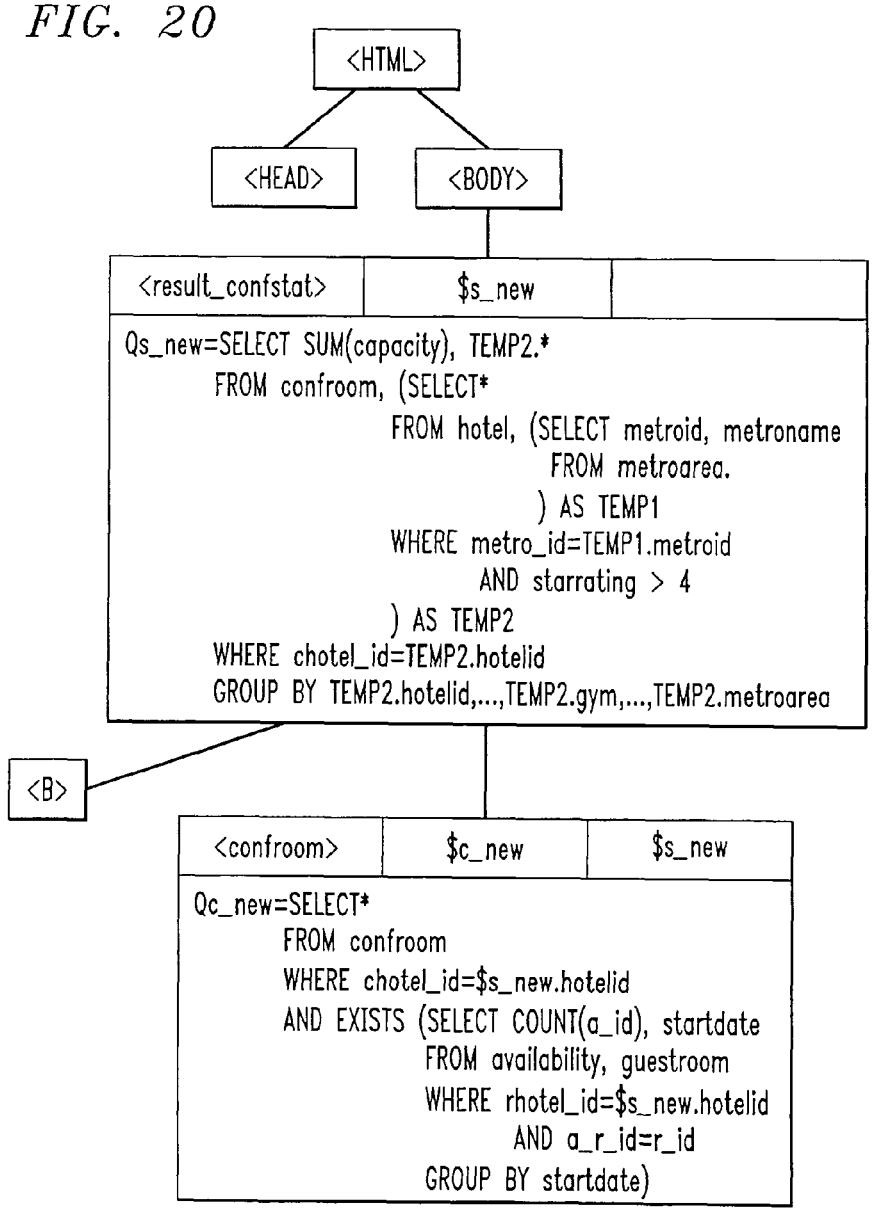
FIG. 19 provides an example of a forced unbinding.
FIG. 20 illustrates a stylesheet view v' generated for the example of FIG. 19.

For example, in FIG. 5, each template rule has some output that will become part of the result tree fragment. However, in FIG. 19, ((1, metro),R2) has no output, but one child ((4, confstat),R3). Therefore ott((1, metro),R2) has only two nodes pseudo-root and apply-templates, and only pseudo-root is kept after all output tag trees are connected into OTT (v,x). The stylesheet view for FIG. 19 is shown in FIG. 20.

Complexity of the Algorithm

The time complexity of the algorithm is polynomial when there is at most one incoming edge for each node in context transition graph, and the worst-case time complexity is $O(v^v)$ when this assumption does not hold.

As shown in FIG. 13, the process of generating nodes of CTG (lines 4-7) is bounded by |v|×|x|, where |v| is the number of nodes in schema tree query v and |x| is the number of rules in stylesheet x. Since there are no conflicting rules in XSLT$_{basic}$, the number of nodes in CTG is bounded by |v| instead of |v|×|x|. Therefore, the process of generating edges of CTG (lines 8-14) is bounded by $|v|^2 \times max_a$, where max$_a$ is the maximum number of apply-templates nodes in a rule in x. The number of edges is also bounded by $|v|^2 \times max_a$. Each edge is annotated with a select-match subtree, with different tag queries. The process of generating TVQ (lines 16-22) involves translating each of such select-match subtrees to a SQL query by unbinding. As shown in FIG. 17, such unbinding is bound by the number of nodes in a select-match subtree, say max$_b$. The rest of the steps for generating output tag tree and stylesheet view are bounded by the number of nodes and edges of CTG (and also TVQ). Therefore, the worst-case running time of the algorithm is bounded by O(min(|v|×|x|, $|v|^3 max_a max_b$)). In most cases, |v| would be larger than |x|, therefore the running time is $O(|v|^3 max_a max_b)$.

However, the nodes with multiple incoming edges should be duplicated in the TVQ (line 17). For a node (n,r) in CTG, its number of incoming edges is at most |v|×max$_a$. Such a node needs to be duplicated once for every incoming edge and becomes a child of every parent in the TVQ. If some of its parents (n',r') also have multiple incoming edges, (n,r) needs to be duplicated again together with (n',r'). This process of duplication will go up until reaching the root of TVQ. Therefore, (n,r) could at most be duplicated $|v| \times (|v| \times max_a)^{|v|-1}$ times. After the duplications are completed, the TVQ is a tree. The total number of nodes is at most $|v| \times (|v| \times max_a)^{|v|-1}$. Of course, this complexity would only be realized in extreme cases and in practice it is expected that rules will be interrelated on a small scale if at all.

Supersets of XSLT$_{basic}$

In this section, several features omitted from the above discussion of XSLT$_{basic}$ are addressed.

XSLTexpression

Figures 21, 22:
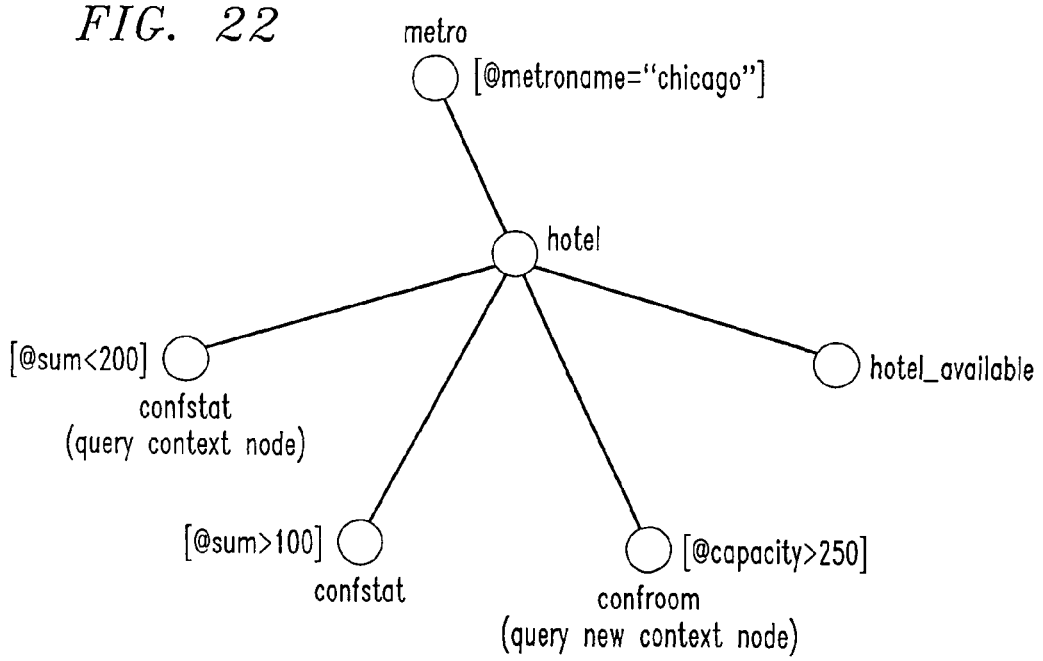
FIG. 21 provides an example of a stylesheet with predicates.
FIG. 22 illustrates a tree pattern query for select-match subtree for the edge from ((4, confstat),R3) to ((5, confroom), R4) in FIG. 21.

XPATH expressions can appear in elements of an XSLT stylesheet including <xsl:template> and <xsl:apply-templates>. Until now, it has been assumed that predicates do not appear in path expressions. But in reality, each step in a path expression can have a predicate, which may be a relational expression (for example testing the value of an attribute) or another path expression (indicating that the relative path must exist). FIG. 21 shows a stylesheet with predicates. The select-match subtree for the edge from ((4, confstat),R3) to ((5, confroom),R4) in FIG. 21 is shown in FIG. 22. Note that there are two <confstat> nodes in the select-match subtree.

The mechanics of pushing expressions from tree-pattern queries into WHERE clauses differs little from M. F. Fernandez et al., "SilkRoute: Trading between Relations and XML," *Int'l World Wide Web Conf.* (*WWW*), (May 2000); or J. Shanmugasundaram et al., "Querying XML Views of Relational Data," *Proc. of the 27th Int'l Conf. on Very Large Data Bases* (*VLDB '01*), 261-70 (2001), and the present discussion is limited to the effect that predicates have on the present invention, in particular the COMBINE function described above the section entitled "Functions Used in Composition," the UNBIND function in FIG. 17, and the NEST function. The new COMBINE function is almost identical to the previous function, except that when two nodes $n_1$ and $n_2$ with predicates $p_1$ and $p_2$ are unified to form node u, u is given predicate $\{p_1$ and $p_2\}$. Because of the existence of predicates, in addition to the procedure described in FIG. 13, the unbinding of queries must also check if predicates are satisfied for all nodes in the select-match subtree. The changes to the unbinding function and NEST are shown in FIG. 19.

The unbound query for select-match subtree on edge between ((4, confstat),R3) and ((5, confroom),R4) of FIG. 21, after renaming of binding variables, is shown in FIG. 24. In this example, two predicates for <confstat> and <metro> appear, and two additional EXISTS checks appear, with the predicates inside the sub-queries.

XSLTtransformable

In this section, it is shown that some supersets of $XSLT_{basic}$ can be transformed to features in $XSLT_{basic}$, and can therefore be processed by the present invention.

FlowControlElements

An <xsl:if> element appearing in a rule r can be handled by introducing a new template rule with a previously unused mode mnew. The contents of the <xsl:if> are used as the body of the new template rule. An <apply-templates> statement replaces the <xsl:if> in r, uses the test of the <xsl:if> as its select and specifies mnew as the mode. This is illustrated in FIG. 25. In FIG. 25, nodename is the name in the last location step in the pattern. <xsl:choose> can be similarly handled by viewing it as a group of template rules as shown in FIG. 26. The transformation for <xsl:for-each> is very similar to that for <xsl:if>.

XSL: Valueof Elements

In $XSLT_{basic}$, the select attribute of <value-of> must be ".". In general, however, it can be an XPATH expression. Similarly to the handling of flow-control elements, discussed above, <xsl:value-of> can be handled by viewing it as a new template rule matched by implicit <apply-templates> in the rule in which it resides. The transformation is shown in FIG. 27.

Conflict Resolution for Template Rules

Each template rule in a XSLT stylesheet has its priority, which varies by position in the stylesheet, and also by the order of included and imported stylesheets. When multiple rules match a node, XSLT needs a conflict-resolution scheme to select the one rule with the highest priority to apply. The conflict-resolution scheme itself brings no difficulty because the priorities of template rules are statically determined at view-composition time. The conflict-resolution facility in G. Moerkotte, "Incorporating XSL Processing Into Database Engines," *Proc. 28th In'l. Conf. Very Large Data Bases, VLDB,* 107-18 (2002), could be used for this purpose. The problem arises from the fact that it is impossible to determine at view-composition time whether a template rule will match a node. This is because the match pattern in a template has not only name tests but also predicates, the values of which are determinable only during XSLT evaluation at runtime.

The following approach can be used to compose conflict resolution into SQL queries in an XML view. Suppose there is a set of template rules that have the same node name in their last location step (which means they potentially could be conflicting rules). First arrange them as a list of rules in the order of priority. Then in each rule add <xsl:when> elements to test whether the node can be matched by some higher priority rule. The transformation is shown in FIG. 28. Note that the original n rules have the same mode "m", otherwise they cannot conflict with each other. As seen in FIG. 28, each new <xsl:when> element checks for an "expression i" which is the reverse of the "pattern i" in the i-th template rule. For example, if the pattern i after extension is name1{p1}/name2{p2}/.../namen{pn}, then expression i is .{pn}/.../parent::name2{p2}/parent::name1{p1}.

XSLTrecursion

Recursion between rules (or with a single rule) can easily arise if the parent or ancestor axes are allowed. In this section, an approach to dealing with this recursion is provided, in order to speed up the overall processing time by pushing computation from the stylesheet to the query processor, while leaving the recursion to be handled by the XSLT processor with a modified stylesheet.

Figure 30:
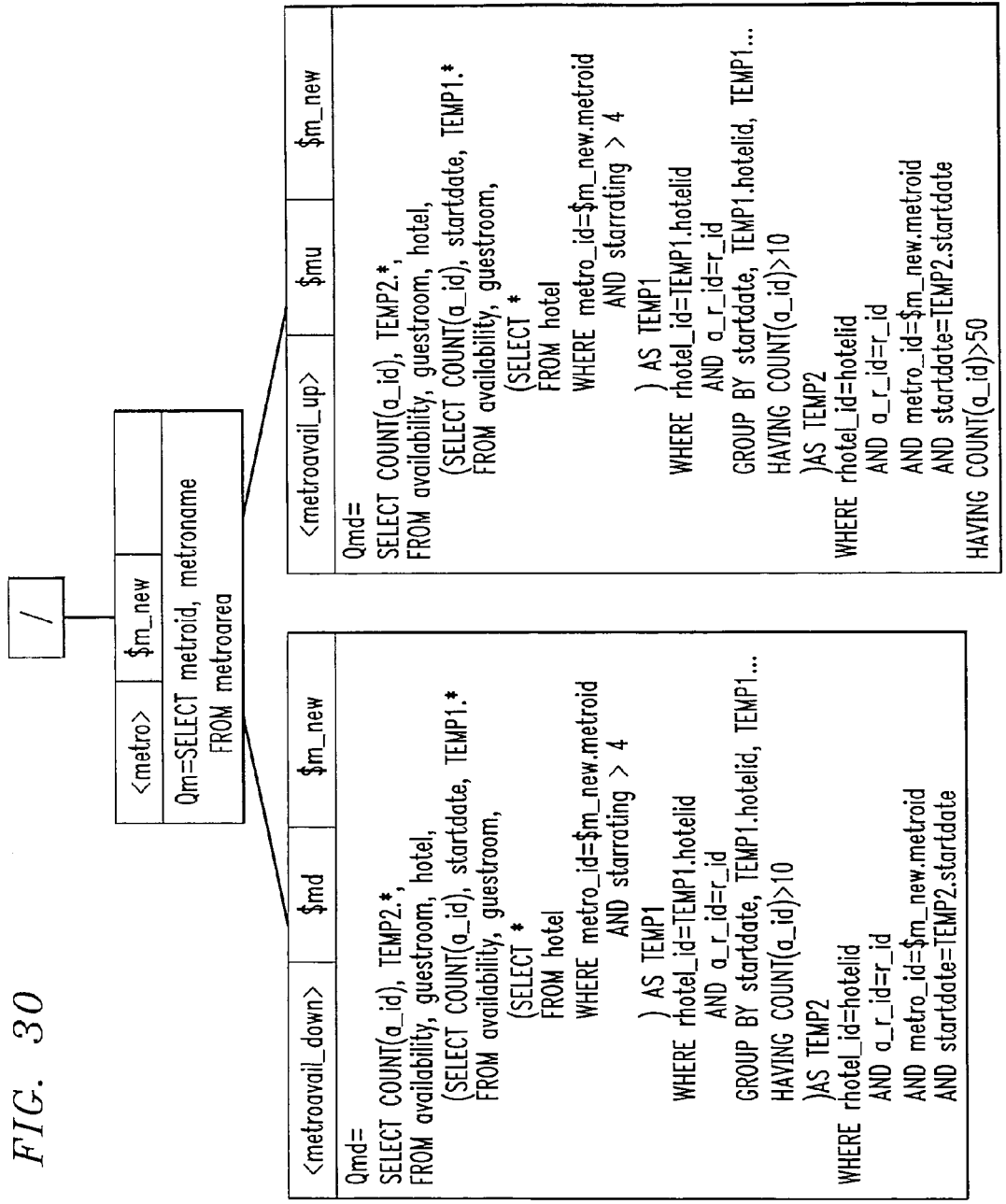
FIG. 30 illustrates a stylesheet view v' for composing the example of FIG. 29 with the schema tree query of FIG. 1.

For example, FIG. 29 is a stylesheet x with recursive rules (R1 and R2). Composing stylesheet x with the schema tree query v in FIG. 1 results in stylesheet view v' in FIG. 30 and new stylesheet x' in FIG. 31. By inspection, it is seen that x' on v' obtains the same result as running x on v. However, the <result metroavail> nodes are generated without materializing many of the intermediate nodes such as <hotel>, <confstat> and <confroom>.

Embodying Invention as Apparatus and Articles of Manufacture

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for exporting at least a portion of a relational database to an XML document, comprising the steps of:
   obtaining an initial view query that defines an XML view on said relational database and an XSLT stylesheet specifying at least one transformation;

modifying said initial view query to account for an effect of said at least one transformation specified in said XSLT stylesheet;
applying said modified view query that accounts for said effect of said at least one transformation specified in said XSLT stylesheet to said relational database to obtain said XML document;
generating a first graph representing processing done by said XSLT stylesheet; and
combining said first graph with a second graph to produce a combined graph, wherein said second graph represents said initial view query by matching pairs of nodes from the first and second graphs and wherein said combined graph is a context transition graph for an XSLT stylesheet executed on said initial view query.

2. The method of claim 1, wherein said XSLT stylesheet is based on a restrictive subset of XSLT.

3. The method of claim 1, wherein said context transition graph captures context transitions that occur when evaluating said XSLT stylesheet on said XML document produced by said initial view query.

4. The method of claim 1, further comprising the steps of pruning said combined graph to remove unnecessary nodes; and modifying said combined graph to produce a modified view query that handles formatting instructions.

5. The method of claim 4, further comprising the step of generating a traverse view query from a context transition graph prior to generating said modified view query, said traverse view query capturing traversal actions of said XSLT stylesheet on said XML document produced by said initial view query.

6. The method of claim 5, wherein said formatting instructions are expressed as output tag trees for each node in said traverse view query; and further comprising the step of combining said output tag trees and said traverse view query to generate said modified view query.

7. The method of claim 1, wherein said obtained XML document is substantially similar to a second XML document produced by applying said XSLT stylesheet on said XML document produced by said initial view query.

8. A method for generating a modified view query against a relational database to produce an XML document, comprising the step of:
composing an XSLT stylesheet with an XML view on said relational database to produce said modified view query;
generating a first graph representing processing done by said XSLT stylesheet; and
combining said first graph with a second graph to produce a combined graph, wherein said second graph represents an initial view query that defines said XML view on said relational database by matching pairs of nodes from the first and second graphs, wherein said combined graph is a context transition graph for an XSLT stylesheet executed on said initial view query, wherein said context transition graph captures context transitions that occur when evaluating said XSLT stylesheet on said XML document produced by said initial view query.

9. The method of claim 8, wherein said context transition graph includes selecting and matching transformations from said XSLT stylesheet.

10. The method of claim 8, further comprising the steps of pruning said combined graph to remove unnecessary nodes; and modifying said combined graph to produce a modified view query that handles formatting instructions.

11. The method of claim 10, further comprising the step of generating a traverse view query from a context transition graph prior to generating said modified view query, said traverse view query capturing traversal actions of said XSLT stylesheet on said XML document produced by said initial view query.

12. The method of claim 11, wherein said formatting instructions are expressed as output tag trees for each node in said traverse view query; and further comprising the step of combining said output tag trees and said traverse view query to generate said modified view query.

13. The method of claim 8, wherein an obtained XML document is substantially similar to a second XML document produced by applying said XSLT stylesheet on said XML document produced by said initial view query.

14. A method for generating a modified view query against a relational database to produce an XML document, comprising the steps of:
generating a first graph representing processing done by an XSLT stylesheet;
combining said first graph with a second graph to generate a combined graph representing a view query that defines an XML view on said relational database by matching pairs of nodes from the first and second graphs, wherein said combined graph is a context transition graph for said XSLT stylesheet executed on an initial view query that defines said XML view on said relational database;
pruning said combined graph to remove unnecessary nodes; and
modifying said combined graph to produce said modified view query that handles formatting instructions.

15. The method of claim 14, wherein said context transition graph captures context transitions that occur when evaluating said XSLT stylesheet on said XML document produced by said initial view query.

16. The method of claim 14, further comprising the step of generating a traverse view query from said context transition graph prior to generating said modified view query, said traverse view query capturing traversal actions of said XSLT stylesheet on said XML document produced by said initial view query.

17. The method of claim 16, wherein said formatting instructions are expressed as output tag trees for each node in said traverse view query; and further comprising the step of combining said output tag trees and said traverse view query to generate said modified view query.

18. A system for exporting at least a portion of a relational database to an XML document, comprising:
a memory; and
at least one processor, coupled to the memory, operative to:
obtain an initial view query that defines an XML view on said relational database and an XSLT stylesheet specifying at least one transformation;
modify said initial view query to account for an effect of said at least one transformation specified in said XSLT stylesheet; and
apply said modified view query that accounts for said effect of said at least one transformation specified in said XSLT stylesheet to said relational database to obtain said XML document;
generate a first graph representing processing done by said XSLT stylesheet; and
combine said first graph with a second graph to produce a combined graph, wherein said second graph represents said initial view query by matching pairs of nodes from the first and second graphs and wherein said combined graph is a context transition graph for an XSLT stylesheet executed on said initial view query.

19. The system of claim 18, wherein said XSLT stylesheet is based on a restrictive subset of XSLT.

20. The system of claim 18, wherein said context transition graph captures context transitions that occur when evaluating said XSLT stylesheet on said XML document produced by said initial view query.

21. The system of claim 18, wherein said processor is further operative to prune said combined graph to remove unnecessary nodes; and modify said combined graph to produce a modified view query that handles formatting instructions.

22. The system of claim 21, wherein said processor is further configured to generate a traverse view query from a context transition graph prior to generating said modified view query, said traverse view query capturing traversal actions of said XSLT stylesheet on said XML document produced by said initial view query.

23. The system of claim 22, wherein said formatting instructions are expressed as output tag trees for each node in said traverse view query; and further comprising the step of combining said output tag trees and said traverse view query to generate said modified view query.

24. The system of claim 18, wherein said obtained XML document is substantially similar to a second XML document produced by applying said XSLT stylesheet on said XML document produced by said initial view query.

* * * * *